June 23, 1931.  L. BENZ  1,811,109
TIRE RIM
Filed Oct. 25, 1930  2 Sheets-Sheet 1
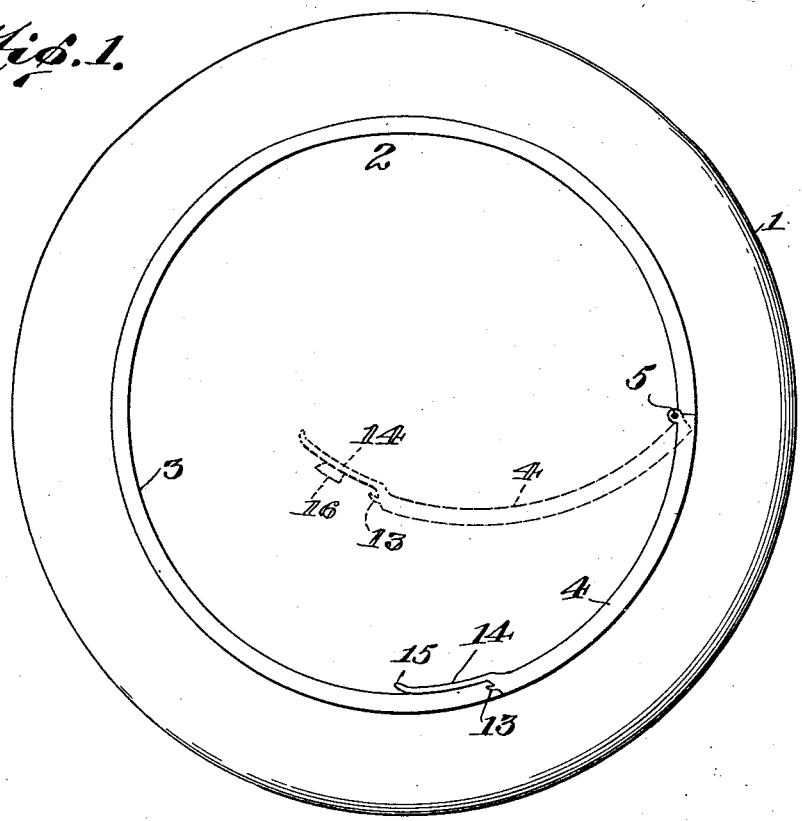
Fig. 1.
Fig. 5.
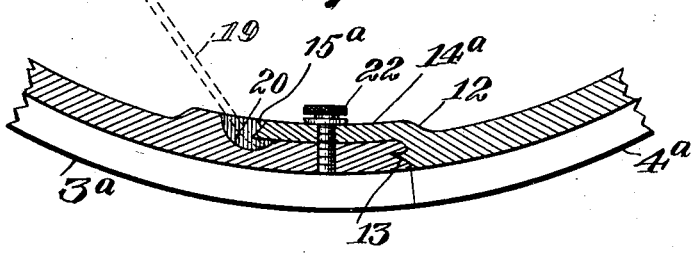
INVENTOR.
Louis Benz.
BY
His ATTORNEYS.

June 23, 1931.       L. BENZ       1,811,109
TIRE RIM
Filed Oct. 25, 1930     2 Sheets-Sheet 2
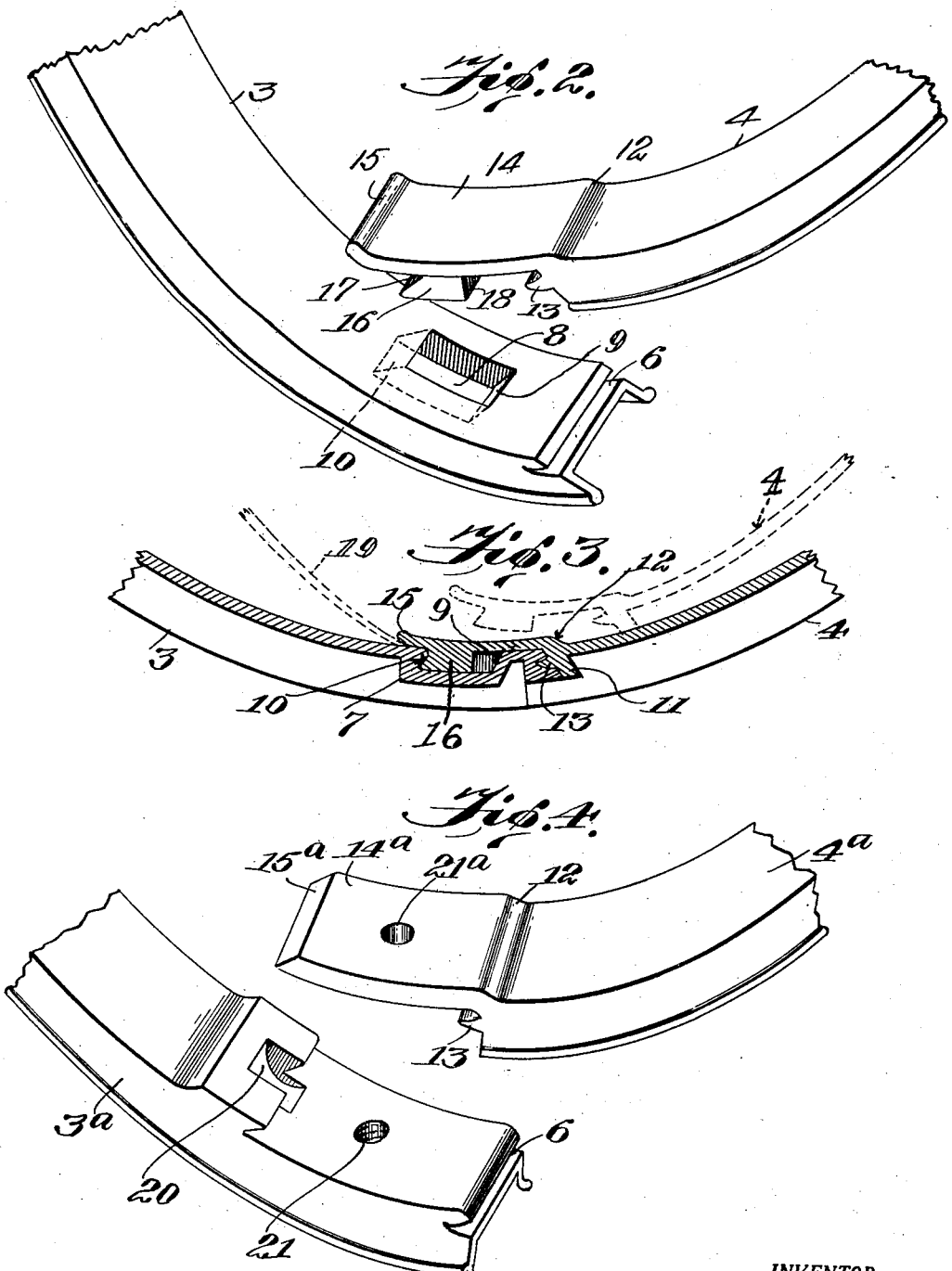

Patented June 23, 1931

1,811,109

UNITED STATES PATENT OFFICE

LOUIS BENZ, OF DENVER, COLORADO

TIRE RIM

Application filed October 25, 1930. Serial No. 491,287.

This invention relates to improvements in tire rims.

An object of my invention is the construction of a simple and efficient sectional tire rim which is provided with efficient interlocking means for holding certain contiguous ends of the sections together.

Another object of my invention is the construction of novel interlocking means on meeting ends of contiguous sections, which interlocking means saves time in positioning a rim on a tire or the removing of the same from the tire, as the case may be.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a view in side elevation of a tire with my improved rim mounted thereon.

Figure 2 is an enlarged fragmentary, perspective view of my rim, showing the ends of the sections separated.

Figure 3 is a fragmentary longitudinal vertical sectional view of the rim.

Figure 4 is an enlarged fragmentary perspective view of another embodiment of my rim, showing the ends of the sections separated, while Figure 5 is a fragmentary longitudinal, vertical, sectional view of this embodiment, with the ends assembled.

In carrying out my invention, it will be understood that as many sections as desired may be hingedly connected, but that the ends of certain two contiguous sections must be quickly separable for allowing the mounting or demounting of a tire rim on a tire. In the preferred embodiment shown in the accompanying drawings, I have preferably illustrated two sections in each rim. Therefore, referring to the drawings by numerals, 1 designates the tire upon which is mounted the rim 2. This rim 2 comprises a primary section 3 and an auxiliary section 4. These sections are hingedly connected at 5. In the free end of primary section 3 is formed a transverse horizontal slot 6. This slot 6 is curved slightly inwardly or "upwardly" for the purpose hereinafter described. Contiguous to slot 6 is a depending bulged portion 7 in which is formed pocket 8. This pocket 8 has a bevelled end 9 and a recessed end 10. The auxiliary section 4 is provided with a depending flange 11 (Fig. 3), and with an upstanding portion 12. A horizontal forwardly-extending spur flange 13 is integral with flange 11 and upstanding portion 12; this spur flange 13 is slightly curved inwardly, corresponding in shape to the transverse, horizontal slot 6. A forwardly-extending tongue 14 projects from the upstanding portion 12; this tongue 14 has on its outer end an inwardly extending lip 15. Centrally of tongue 14 is a depending shoe 16. This shoe 16 has an outer bevelled end 17 and an inner straight end 18. The bevelled end 17 is adapted to fit snugly against the recessed end 10 of pocket 8 when the parts are assembled, with the spur flange seated in slot 6. The pocket 8 is of sufficient length to easily allow this positioning. When the parts are assembled, as shown in Fig. 3, no accidental displacement can occur, as my novel interlocking means is an efficient fastening. However, if it is desired to separate the interlocking ends, all that the operator needs to do is to apply a suitable tool (indicated by dotted line 19, Fig. 3) under the inwardly-extending lip 15 and pry outwardly on the lip, which causes the shoe 18 to slide back towards wall 9 of pocket 8, displacing the bevelled end 17 from the recessed end 10 and the spur flange 13 from the slot 6, whereupon the interlocking ends will be separated as shown in Figure 2.

In the embodiment shown in Figures 4 and 5, the primary section 3a is provided with a tool socket 20 and with a threaded aperture 21. In its outer end is formed transverse horizontal slot 6, the same as shown in Figure 2. The auxiliary section 4a is provided with upstanding portion 12 integral with forwardly-extending tongue 14a. In tongue 14a is aperture 21a which is adapted to register with aperture 21. Contiguous to the inwardly extending portion 12, on auxiliary section 4a is a horizontal forwardly-extending spur flange 13, similar to that shown in Figures 1 and 3. When the interlocking ends of the sections shown in Figures 4 and 5 are placed together, the spur flange will be in the slot 6 and by means of a headed bolt 22, placed in aperture 21a and threaded into aperture 21, the interlocking ends are secured against accidental displacement. A tool 19 (dotted lines) may be inserted into tool socket 20, under the lip 15a and when bolt 22 is removed, the tool will easily separate the interlocking ends, as shown in Figure 4. It will, therefore, be seen that broadly speaking, there is fastening means at the middle of both of the tongues 14 and 14a with a horizontal forwardly-extending spur flange contiguous to the inner ends of the tongues.

From the foregoing, it will be understood that I have provided efficient and simple means of a novel character for quickly fastening the separable ends of a tire rim together.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a tire rim, the combination of a primary section provided in one end with a slot, an auxiliary section provided at one end with a forwardly extending tongue adapted to overlap said primary section, said auxiliary section provided beneath said tongue and contiguous thereto with a forwardly extending spur flange adapted to fit into said slot, and means centrally located on said tongue and primary section for assisting in securing the same together.

2. In a tire rim, the combination of a primary section provided in one end with a transverse horizontal slot extending across same, an auxiliary section provided at one end with an upstanding portion terminating in a forwardly extending tongue, said auxiliary section provided under said tongue with an integral horizontal forwardly extending spur flange of the same width as and normally seated in said transverse horizontal slot, and said tongue and primary section provided with fastening means.

3. In a tire rim, the combination of a primary section provided with a slot in one end, an auxiliary section provided with a tongue and a spur flange, said spur flange adapted to fit into said slot, and fastening means on the tongue and primary section.

4. In a tire rim, the combination of a primary section provided in one end with a transverse horizontal slot, said slot having a slight inward curvature in cross section, said primary section provided near said slotted end with a depending bulged portion, said bulged portion provided with a pocket, said pocket provided with a bevelled end and with a recessed end, an auxiliary section provided near one end with a depending flange and inward of said flange with an upstanding portion, said upstanding portion terminating in a forwardly extending tongue, said tongue provided on its outer edge with an inwardly extending lip, said depending flange and upstanding portion provided with a horizontal forwardly extending spur flange, said spur flange being of the same width as said transverse horizontal slot and also being curved slightly inwardly to fit said transverse horizontal slot, said tongue provided near its middle with a depending shoe, said shoe adapted to be positioned in said pocket of said depending bulged portion, and said shoe provided with a bevelled end adapted to fit snugly against said recessed end of the pocket, substantially as shown and described.

5. In a tire rim, the combination of a primary section provided with a slot in one end and with a pocket contiguous to said slot, an auxiliary section provided with a tongue at one end and with a forwardly extending spur flange under said tongue, said spur flange adapted to fit into said slot, and said tongue provided with a depending shoe adapted to fit into said pocket.

6. In a tire rim, the combination of a primary section provided with a slot in one end and with a pocket intermediate its ends and sides, an auxiliary section provided with a spur flange and with a tongue, and said tongue provided with a shoe adapted to fit into said pocket and with said spur flange fitting into said slot.

7. In a tire rim, the combination of a primary section provided with a slot and a pocket, an auxiliary section provided with a tongue and with a spur flange, said tongue provided with a depending shoe, and said shoe adapted to fit into said pocket and said spur flange into said slot in an interlocking manner, against accidental displacement.

8. In a tire rim, the combination of a primary section provided with a slot and with a pocket both having forwardly extending inclined walls, an auxiliary section provided with two projections having inclined walls, and said inclined walls of said projections adapted to fit the forwardly extending inclined walls of said slot and pocket.

In testimony whereof I hereunto affix my signature.

LOUIS BENZ.